Jan. 7, 1958   C. A. BOOKER, JR., ET AL   2,819,372
RANGE SURFACE UNIT CONTROL
Filed Jan. 21, 1953   4 Sheets-Sheet 1

WITNESSES:

INVENTORS
Clyde A. Booker, Jr.
and George W. Nagel.
BY
ATTORNEY

Jan. 7, 1958 C. A. BOOKER, JR., ET AL 2,819,372
RANGE SURFACE UNIT CONTROL
Filed Jan. 21, 1953 4 Sheets-Sheet 2

WITNESSES:
Robert C. Baird
Leon J. Jaza

INVENTORS
Clyde A. Booker, Jr.
and George W. Nagel.
BY
Paul E. Friedemann
ATTORNEY

Fig. 4.

INVENTORS
Clyde A. Booker, Jr.
and George W. Nagel.
BY Paul E. Friedemann
ATTORNEY Jan. 7, 1958  C. A. BOOKER, JR., ET AL  2,819,372
RANGE SURFACE UNIT CONTROL
Filed Jan. 21, 1953  4 Sheets-Sheet 4

Fig. 7.

INVENTORS
Clyde A. Booker, Jr.
and George W. Nagel.
BY
Paul E. Friedemann
ATTORNEY

United States Patent Office 2,819,372
Patented Jan. 7, 1958

2,819,372

RANGE SURFACE UNIT CONTROL

Clyde A. Booker, Jr., and George W. Nagel, Pittsburgh, Pa., assignors to Westinghouse Electric Corporation, East Pittsburgh, Pa., a corporation of Pennsylvania Application January 21, 1953, Serial No. 332,234

20 Claims. (Cl. 219—20)

Our invention relates to an improved electric heating device, particularly an electric heating device for cooking or similar service where it may either be desired to preselect the temperature to which the charge is to be heated, or, in case the charge is a liquid, it may be desired to preselect the rate at which the boiling of the liquid will proceed. For example, in using an electric range, the housewife may at times wish to subject one food to a slow boiling at 212° F., the boiling-point of water, and at other times may wish to fry another food at a temperature far above the boiling point of water. Our arrangement makes it possible for the housewife to preset a control knob so that the food will be heated to any desired cooking temperature whether above or below 212° F. and also, when boiling is the thing she desires, to predetermine whether the boiling shall be carried on at a slow, a moderate or a rapid rate. In each setting the full available power of the heating element is used to bring the temperature rapidly up to the value selected, the heat input is then controlled so as to maintain the selected temperature or the desired rate of boiling, and no overheating is permitted regardless of any changes in the condition of the heated substance. Also, if food containing water is left on a heater preset for boiling, not only is the heat input controlled to maintain the preset rate of boiling as long as water remains in the utensil, but if the water should all boil off, the control then functions to limit the resultant temperature rise to a nominal value.

While we describe the application of our heater control system as applied to an electric range for household cooking, ways will be evident to those skilled in the art in which its principles may be applied to electric heating generally where it is desired to control processes involving change of phase occurring at a nearly constant temperature in the heated substance.

Electric ranges of the types being marketed today are usually provided with a control knob by which the wattage input to the electric heating element may be regulated at will; but frequent adjustment of this knob by the housewife is required in cooking if the cooking is to be done promptly and yet the food not be burned or overheated. For example, if the control knob is set at the position which will produce but not exceed the desired final cooking temperature, the heating wattage will be so low that the food will heat up to that temperature very slowly. Hence, the control knob is usually first set to insure full wattage input, and the housewife must remember, at the right time, to reduce the setting on the control knob to the lower wattage actually desired for the cooking operation. Moreover, even greater attention is required in the rather more numerous occasions when foods with a large water-content are being cooked, since control knob settings which will heat the food rapidly to the boiling temperature will either cause the water to boil over, if much of it is present in the cooking utensil, or will boil it all away and badly scorch the food if the water is present in small amount. Repeated adjustments of the control knob by the housewife are frequently requisite to a satisfactory cooking operation in such cases.

Our invention is an improvement upon that described in U. S. Patent 2,500,061, issued to Earl K. Clark on March 7, 1950, which likewise discusses certain of the aspects of electric cooking. Our invention is also an improvement upon that described and claimed in application Serial No. 404,923, filed January 19, 1954, by Donald F. Aldrich and Lyle H. Wall.

Figure 1:
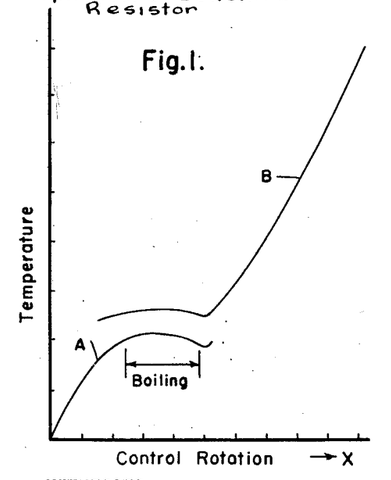
Figure 1 is a graph relating control-knob angle (abscissa) with cooking-utensil temperature (° Fahrenheit)

One of the principal objects of our invention is to provide a control system which may be preset to heat rapidly to any temperature above or below boiling, thereafter maintaining that temperature with a high degree of precision until shut down by the operator, and which may carry out a boiling operation at a rate preset by the operator at any value within a wide range of values. This we achieve by maintaining in good thermal contact with the cooking utensil being heated a temperature-variable electric circuit-element, such as a resistor, which unbalances an electronic control network and shuts off heater current at a temperature which is predetermined by the setting of a control knob for cooking operations other than boiling. Variations in the temperature-variable resistor alter the grid-voltage of an electron-tube amplifier to cut off or turn on heater current when a critical cooking utensil temperature is reached; and the value of this critical temperature is predetermined by the setting of certain balance-resistors which is fixed by the position of the control knob. By changing the control knob position, the value of this critical temperature at which the electron tubes cut off heater current is adjusted at will by the housewife. A relationship thus exists between the angular position of the control knob and the temperature at which heater current will be cut off and turned on; and this relationship may be represented by a graph plotted between control knob setting and cooking utensil temperature which will result from it. Fig. 1 herein shows such a graph.

The object outlined above should, for commercial reasons, be attained with a reasonably uniform control-knob setting scale which does not require extreme precision in adjusting to get desired cooking temperatures in one part of the scale, and coarse adjustment for other temperatures. The portions below 204° F. and above 235° F. in the graphs of Fig. 1 are of nearly uniform slope and so fulfill this requirement.

As has already been pointed out, it is desirable in cooking foods containing water that the housewife be able to preset the range to boil at a selected rate, slow or fast, as she may desire. The apparatus of Aldrich and Wall attains this objective by supplying full wattage to the heater for a certain fraction of the time, the heater being turned off for the rest of the time. If the total period of on-off cycle is sufficiently short, the cooking results are sensibly the same as if the required average wattage had been supplied to the heater continuously. By alternately and automatically shifting the calibration of the control to temperatures above and below the boiling temperature when the control knob is set within the boiling range, power to the heater will be turned on and off periodically as long as the utensil stays at the boiling temperature. During the time that the control is calibrated for a temperature below boiling, power will not be supplied to the heater since the utensil temperature is above the temperature for which the control is set; and when the control is calibrated for a temperature above boiling, power will be supplied to the heater. With the control knob set within the boiling range, the calibration of the control is shifted periodically by a cycling switch, for example, by inserting an auxiliary resistor in the temperature controlling network for a certain fraction of the time.

As previously stated, a graph may be plotted relating to the control knob setting and cooking utensil temperature, as in Fig. 1. The switching of the auxiliary resistor, as just described, in effect changes the temperature scale of this graph so that a complete depiction of the operation of the control comprises two graphs such as A and B in Fig. 1, branch A representing operation with the auxiliary resistor disconnected and branch B representing operation with it in circuit. The cycling switch may thus be considered to shift the system periodically from operation on calibration curve A to operation on calibration curve B. The fraction of each period of the cycling switch during which the auxiliary resistor is connected in circuit is adjusted by moving the control knob so that the respective durations of the alternative operations, and hence the average wattage input to the heater, may be set by the housewife by turning the control knob within the boiling range. As the knob is turned clockwise the average power input and consequently the vigor of boiling is progressively increased until at the end of the range the full wattage of the heater is called for by connecting the auxiliary resistor in the circuit 100% of the time. If the control is set in the boiling range and all the water is permitted to boil away, the temperature of the utensil will be limited to a value set by branch B of the curve in Fig. 1.

In the illustrated embodiments, it has been chosen to leave the auxiliary resistor connected in permanently for the temperature range above boiling, although it is possible to operate with this resistor not connected and to follow a further rising portion of the branch A of the calibration which has not been shown in Fig. 1. Operation with the auxiliary resistor disconnected in the upper temperature range permits the housewife to select temperatures between about 204° F. and 235° F. which are not available if the resistor is permanently connected in the upper temperature range, but there would be a marked discontinuity in the action of the unit at the transition between the upper end of the boiling range and the temperature controlled range. In a commercial unit this discontinuity cannot be located with sufficient accuracy to insure that the desired control setting is always achieved; therefore our preferred embodiments omit a narrow range of possible temperature settings in order to achieve a continuously rising characteristic on the control dial.

One object of our invention is accordingly to provide an electric range, which may be preset to operate below and above the boiling point of water at any desired temperature, while near the boiling-point it may be preset to boil with any desired rapidity.

Another object is to provide an electric range of the type described in the preceding paragraph which will operate at the maximum wattage input while heating to the preset temperature, and will automatically reduce the wattage input in the necessary degree to maintain such temperature when the preset temperature is reached.

Another object is to provide an electric heater for utensils containing water which may be set to produce either a low or high evaporation rate but which will reduce the wattage supplied to such a value as will prevent heating substantially above the boiling point if the water is all evaporated.

Another object is to provide an electric range control capable of effecting one or more of the objects mentioned above which shall employ electronic controls for the heater current.

Another object is to provide an electric range capable of attaining one or more of the above-mentioned objects in which a single manually-settable control member effects all the presetting functions.

Another object is to provide an electric range having a preset member, the manipulation of which is simple and easily understood, while rugged and easily serviced.

Another object is to provide an electric range capable of attaining the above-mentioned objects which is of long life but adapted to mass production at a reasonable price.

Another object is to provide an electric range capable of effecting the functions mentioned above in which temperature is measured by an electric temperature-sensing member operating with only a low voltage between its terminals.

Another object is to provide an electrically-controlled heater capable of carrying out the functions described above in which, as far as possible, breaking or other failures of types at all likely to occur in the circuit components leave the heater current cut off.

Still another object is to provide a simple resistor network containing in one branch or channel, a temperature variable element and in other channels elements which may be altered by progressive movement of a handle to balance variations in said temperature-variable element while such balance is substantially independent, over a wide range, of variations in the voltage supplied to input terminals of said network.

Still another object is to provide a network of the type described in the preceding paragraph in which the scale of said handle movements to effect a given change in the range temperature is substantially uniform over desired ranges of the scale.

Yet another object is to provide a control which, at any point on a predetermined portion of the path of movement of the control handle, causes the average power input to a heated object to be regulated at a substantially fixed object temperature, while positioning the handle at other portions of its path causes the object to be heated to maintain it at some predetermined temperature.

One object of our invention is to provide a control that provides substantially the same number of degrees change in temperature setting for a given movement of a control handle or knob throughout that range of movement of the knob which is intended to provide change in temperature setting.

Another object is to provide a control of the character set forth in the preceding paragraph which utilizes a potentiometer whose resistance varies in direct proportion to movement of the slider, since this type of potentiometer is more accurate and it is also more readily available.

Other objects of our invention will be evident to those skilled in the art upon reading the following description taken in connection with the drawings in which:

Fig. 5 is a schematic view showing the control system for a heater unit in accordance with our invention;

Referring in detail to the drawings, it is believed that what has already been said renders further description of Fig. 1 superfluous, although it will be mentioned in discussion below.

Figure 2:
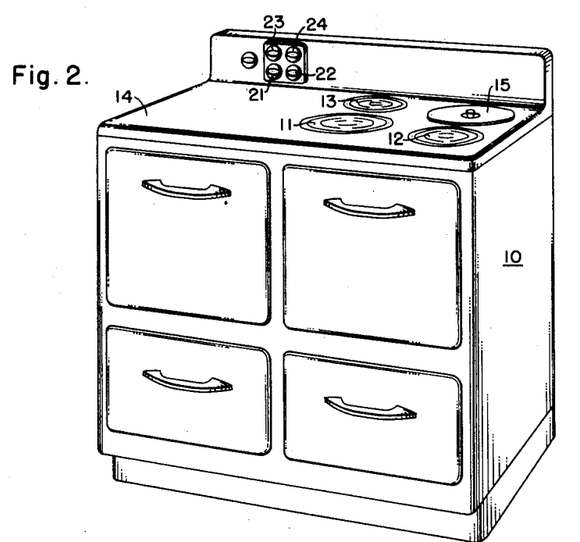
Fig. 2 is a perspective view of an electric range embodying our invention.
Figure 3:
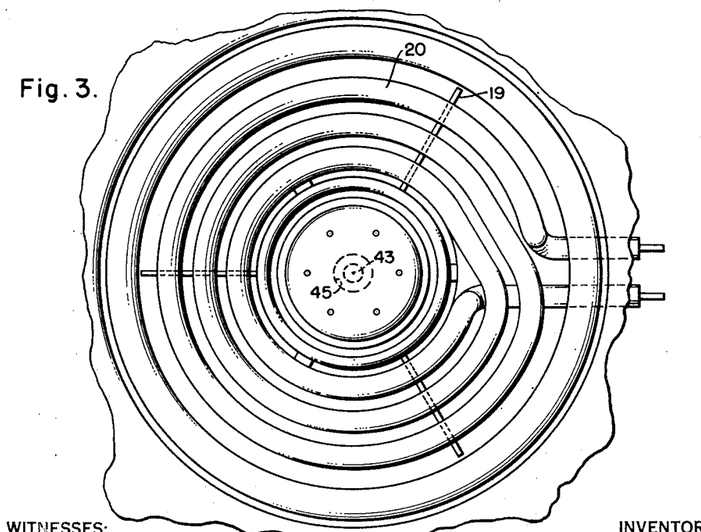
Fig. 3 is a top plan view of one of the heater units for such an electric range as appears in Fig. 2.

In Fig. 2 we show an electric range 10 which may be generally of conventional construction. It includes three surface heating units 11, 12 and 13 disposed in the platform 14, and a deep well cooker 15 which is provided with a heating unit disposed at the bottom of the well, as is well understood in the art. The heating units may be of any suitable electrically-energized type, although we prefer a unit having a tubular or sheathed type of heater 20 as shown in Fig. 3, in which a resistance element is enclosed in a tube or sheath and held therein by insulating material. The tubular heater 20 is arranged in a flat spiral, as shown in Fig. 3, and mounted in a spider 19. The heating unit is mounted in the platform in any suitable manner, the details of which form no part of the present invention. The controls for the heating units 11, 12, 13 and the deep well cooker 15 include manually-adjusted knobs 21, 22, 23 and 24, respectively. These knobs may be located on the front of the backsplasher, as shown in Fig. 2.

Figure 4:
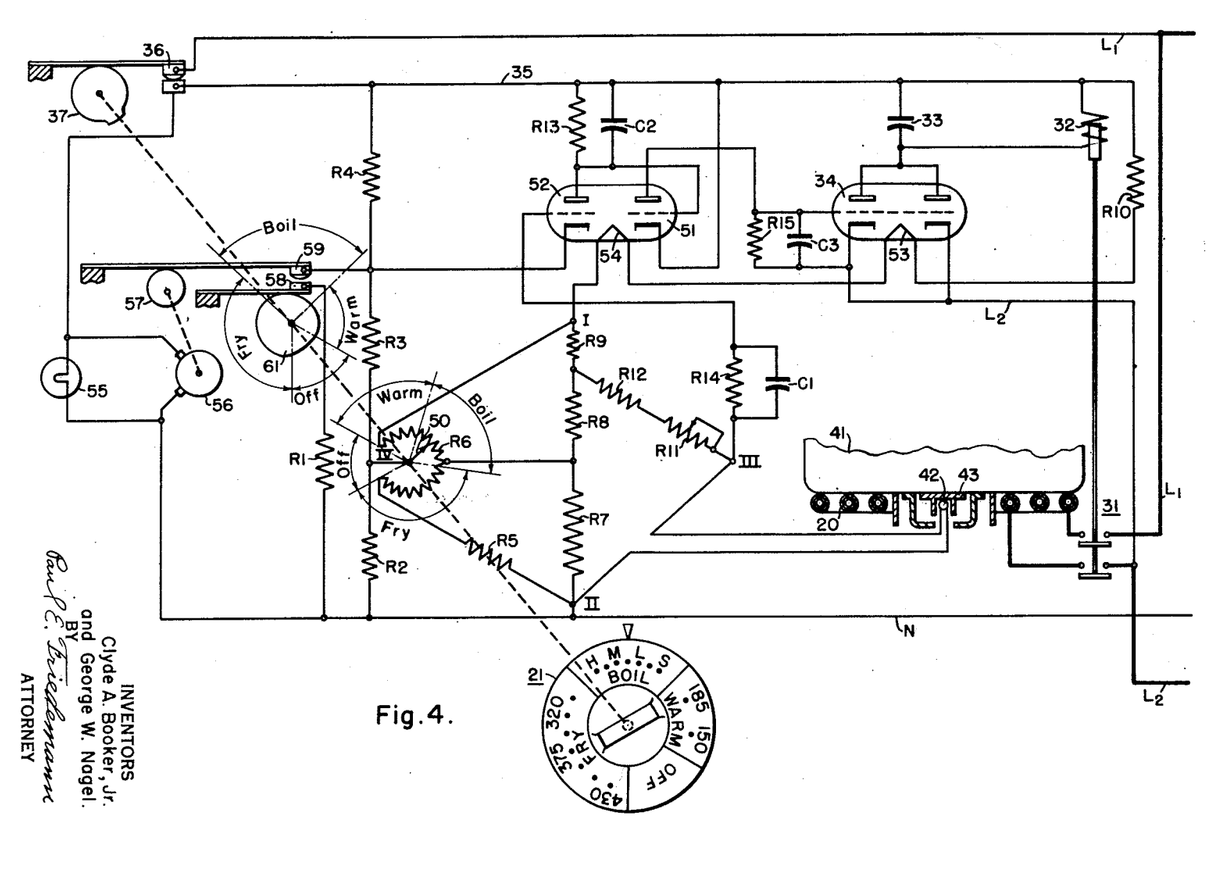

Fig. 4 shows connections for one surface heating unit of the electric range 10 to an ordinary 220 volt alternating current power supply, comprising line wires $L_1$ and $L_2$, each at a voltage of 110 volts relative to the conventional grounded neutral N. The heater 20 is connected across the outer line conductors $L_1$, $L_2$ by a double-pole switch 31, which is biased to open position and is closed by a magnet 32 having a by-pass capacitor 33 and traversed by the plate current of a grid controlled electron discharge tube 34 which may, for example, be of the 12AU7 type. The cathodes of the tube 34 are connected together to line wire $L_2$ and the interconnected anodes draw current from a conductor 35 which is connected to the opposite line wire $L_1$ through a pair of separable contacts 36, which are biased to closed position. A cam 37 on the shaft of control-knob 21 permits the contacts 36 to close except when the control-knob occupies its "off" position which deenergizes the electric heater 20. The control-knob 21 is shown in Fig. 4 as set for operating the heater 20 for boiling water at a medium rate.

Turning the knob 21 (clockwise in Fig. 4) from its "off" position to start a heating operation thus causes the line wires $L_1$ and $L_2$ to send current through tube 34 and winding 32 to close switch 31 and connect heater 20 across the 220 volt lines, keeping it so until the control network presently to be described acts to open switch 31.

Figure 5:
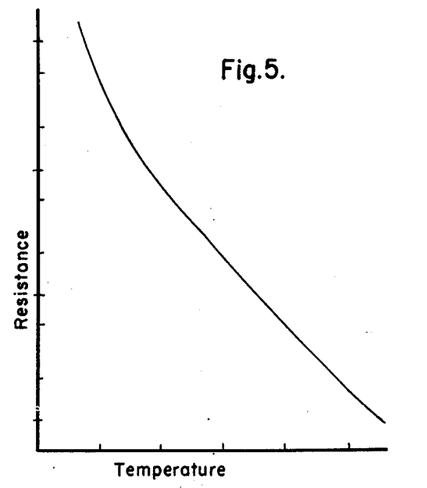
Fig. 5 is a graph relating resistance (ohms) of a temperature-variable resistor we have used to temperature (° F.), as abscissa.

The temperature to which a cooking utensil 41 is heated by the heater unit 20 is sensed by a temperature-variable resistor 42 which may be one of the well-known Thermistors marketed by the Western Electric Company of New York city, and having a resistance which decreases as temperature rises, approximately according to an exponential function. This resistor will hereinafter be termed a thermal resistor. In a particular circuit for which the magnitudes of the various circuit components are listed hereinafter for Fig. 4, the resistance of the thermal resistor which we use varies with temperature as shown by Fig. 5.

The thermal resistor 42 is subjected in any suitable manner to the temperature of the charge to be heated by the heater 20, in this case the cooking utensil 41. In the illustrated embodiments, a disc 43 has a depending tubular portion within which the thermal resistor 42 is disposed and retained, as by a suitable cement. The disc is made of a good heat conducting metal and is biased upwardly into contact with the bottom of the utensil, so that there is good heat conduction between the bottom of the utensil and the resistor 42. Thus, the resistor follows closely the temperature of the bottom of the utensil.

A shield 45 is preferably provided to shield the disc 43 and the resistor 42 from the direct heat rays from the heater 20. One assembly of thermal resistor, disc, shield, and support which we prefer to use but to which the invention is not limited, is shown and claimed in an application of Hans T. Thunander, Serial No. 407,918, filed February 3, 1954.

Current flow through the discharge tube 34, to close and open the switch 31 governing current flow to the heater 20, is controlled by a conventional resistance-capacitance coupling R15—C3 from a triode 51, which has its cathode connected by lead 35 to line $L_1$ and its anode or plate energized from line $L_2$. The grid or control electrode of triode 51 is coupled to the anode or plate of a triode 52 having its anode connected through resistor R13 and lead 35 to line $L_1$ and its cathode connected to the common junction of resistors R3 and R4 in a chain of resistors R2, R3 and R4 which bridges from lead 35 to the grounded neutral N. The resistors R2, R3 and R4 form part of a resistor network comprising resistors R1 through R12, which vary the utensil temperature at which the tube 34 opens switch 31 to cut off current from the heater 20. This is described in greater detail below.

It may be noted that the circuit we use is intended for operation where the electric supply is alternating current and in such cases the voltages impressed on the anodes of tubes 34, 51 and 52 are alternating so that current flows through these tubes only during those half-cycles of that supply when the proper instantaneous polarity exists across the particular tube being considered. It is thus only during alternate half-cycles of line voltage that the voltage impressed on tube 52 is effective; but the alternating voltage present in the control network is in phase with this anode voltage and so controls tube 52 substantially as if the whole voltage system were a direct current one.

Since tube 51 requires the opposite polarity of line voltage for its operation, it will perform its function during the half-cycles when tubes 52 and 34 are inoperative. Capacitors C2 and C3 serve to retain voltage drops caused in resistors R13 and R15 during one half-cycle until the next half-cycle when control of the following tube is required. Any voltage polarities mentioned in the following description refer to those existing during the half cycles of the supply when the anode of the tube being discussed is positive. The necessity of an alternating current supply for this control circuit is not a serious commercial handicap inasmuch as most homes use this type of power.

In the following description of the resistor network, the potential of a given point means its potential during the half cycle of the electric current supply that the conductor $L_1$ is positive and the tube 52 is conducting. When it is said that the potential is increased or decreased it means that the potential is made more or less positive with reference to the grounded neutral N.

It would, of course, be possible in ways obvious to those skilled in the electronics art to cause a temperature-variable resistor like thermal resistor 42 to so alter the grid voltage of an electron tube as to shut off current-flow to a heater unit when a preselected temperature was reached, and also be possible to vary this preselected temperature by manipulating the control-knob of a simple variable resistor in series with the thermal resistor in heating operations where no boiling or other phase-change took place in the heated substance. But in a practical electric range, boiling, or cooking at the boiling point of water, is an important requisite; and the simple arrangement just described would merely make it possible to heat the cooking utensil to boiling, or any other selected temperature, without permitting any control of the rapidity with which boiling proceeded. Such an arrangement lacks much of being satisfactory. One of the principal objects of our invention is to make it possible for the housewife to boil slowly or rapidly, at a rate she can select. Moreover, to be at all satisfactory to the housewife, the control both of cooking utensil temperature and rate of boiling must be performed by one simple adjustment, like turning a single control knob, and a readable scale indicating the adjustment made must be reasonably uniform throughout its range. Furthermore, the calibration of the control should be substantially independent of the rather considerable variations in voltage which are met with in domestic electric supply lines in actual practice. The thermal resistor network mentioned at the outset of this paragraph is wholly inadequate to meet these conditions, and the problem of meeting them is a complex and difficult one. Its solution was effected by the combination of a cycling switch and a resistor network which will now be discussed.

The general form in which we cast this network was dictated by the desire of rendering our tube-control network as immune as possible from voltage-fluctuations on the electric supply lines. With this end in view, we have made the thermal resistor 42 one arm of a circuit of the general bridge type, the resistance of two other bridge arms being varied by the setting of the control-knob 21. This bridge is incorporated in the grid circuit of the electron-tube 52 in such a way that the latter causes cut-off of heater current in the electric range when a pair of diagonally opposite bridge terminals are at substantially the same potential; i. e., when the bridge is balanced. Since bridges (e. g., the well-known Wheatstone bridge) have the property that their balance is substantially independent of the energizing voltage impressed on their input terminals, the slightly modified bridge circuit we use substantially decreases over a considerable range, the effect of variations of the electric supply voltage.

The bridge in question has corners marked I, II, III and IV in Fig. 4 and is evidently a modified, rather than a conventional, Wheatstone bridge. Nevertheless, when the relative magnitudes of the various resistors constituting the network are considered, its behavior is believed to be most readily made evident by considering it, in the first instance, as a bridge, in which arm or channel I—III comprises resistors R11, R12, channel III—II comprises the thermal resistor 42, channel I—IV comprises the portion of potentiometer R6 above its sliding contact and channel IV—II comprises resistor R2 in multiple with the remaining portion of potentiometer R6 and resistor R5. A substantially constant voltage is impressed between corners I and II by a voltage divider which comprises, resistors R7, R8, R9, R10 and the cathode heaters of the electron tubes, and a control voltage for the electron tubes is derived from bridge corners III, IV. The circuit is preferably so proportioned that when the cooking utensil temperature is such as to cause thermal resistor 42 to balance bridge I, II, III, IV, bringing corners III and IV to equal potentials, electron tube 52 causes cut-off of current flow in heater 20.

Corners III and IV could be connected directly to the grid and the cathode of tube 52 to control it provided that tube were of a type operated to cut off plate current flow at a grid voltage of zero. However, it would be inconvenient, commercially at least, to have to use tubes of that type; hence in our arrangement we prefer to intercalate, between the grid and cathode terminals of tube 52 a bias voltage. This bias voltage is produced in our Fig. 4 circuit, by current flow from supply source $L_1$—N through resistor R3 (of the resistor string R2, R3, R4) and by resistor R9. However, resistor R9 is of small value and its presence unnecessary; it is not present in our Fig. 7 circuit. The resistor R3 makes the cathode of the tube 52 slightly more positive, so that the corner III and the grid are slightly negative relative to the cathode at the point where operation varies between the switch 31 being closed and the switch 31 being open.

It will be noted that the bias resistor R3 aids in neutralizing another tendency of supply-line voltage variation to alter the temperature calibration of the control system. Thus drop of line voltage below normal decreases the cathode heating current and the temperature of the electron tube 52 as well as its anode voltage. The current in resistor chain R2, R3, R4 also drops, however, thus decreasing the bias on the grid of tube 52 and neutralizing the tendency of its plate current to decrease.

The periodic switching in and out of an auxiliary resistor, which has previously been mentioned as the preferred expedient for varying the boiling rate, produces its results by decreasing the potential between the cathode of the tube 52 and the neutral N, thereby making the cathode less positive. Operation is thereby shifted from graph A to graph B in Fig. 1. This current variation is produced by a cycling switch 58, 59 which periodically connects and disconnects resistor R1 in parallel with the resistors R2 and R3.

The contact 59 of the cycling switch is constantly moved up and down between upper and lower limits by a cam 57, driven by a motor 56, which is continuously energized as long as the contacts 36 are closed. A cam 61, which is actuated by the knob 21, positions the contact 58 in relation to the contact 59. The portions of the cam 61 that position the contact 58 are designated similarly to the knob 21. The portions of the cam designated "Off" and "Warm" are sufficiently low to position the contact 58 below the lower limit of travel, so that the contacts do not engage. The inclined portion in the region marked 'Boil' is adapted to move the contact 58 gradually upwardly from its lower limit of travel to its upper limit of travel as the knob is moved through its "Boil" zone, from low to high. The higher that the contact 58 is positioned, the longer will be the period in each cycle during which the contacts are in engagement. The "Fry" portion of the cam is sufficiently high to position the contact 58 above the upper limit of travel of the contact 59, so as to maintain the contacts in continuous engagement. Thus, adjustment of the knob to either the "Warm" or "Fry" range renders the cycling switch 58, 59 inactive, preventing cycling of the control temperature.

The effect of this cycling switch arrangement is accordingly to operate the system on curve A of Fig. 1 when the control knob is set below the boiling range; to operate the system on curve B of Fig. 1 when the control knob is set above the boiling range; and to cause operation to shift periodically, at intervals selected by the control knob setting, between curve A and curve B at settings within the boiling range. The housewife thus has cooking temperature outside the boiling range, and rate of boiling within that range, completely within her control.

The curve A in Fig. 1 represents operation with the cycling switch 58, 59 open and therefore applies to the system in the periodic intervals when the switch is open while the control knob is set in its "boiling range." But, with boiling in progress, the temperature of the utensil bottom, to which the thermal resistor is responsive, can never rise above 212° by more than a temperature differential due to heat flow from the utensil wall into the water. Hence the portion of curve A lying at values of its abscissa $x$, within the range marked "Boiling" should ideally, never rise to 212°. For analogous reasons, the portion of curve B (which represents operation with the switch 58, 59 closed) which lies within the "boling range" of $x$ should, ideally, all lie above 212°. Hence, to meet the requirements previously laid down herein, those curve A and B must have fairly straight rising portions outside the limits of the "boiling range," and horizontal portions within it.

The way in which tube 52 is operated to control supply of power to heater 20 will now be pointed out, leaving explanation of how the resistance is proportioned to attain uniformity of scale for the control knob for later discussion.

When the control knob 21 in Fig. 4 is moved from its "off" position, it closes the contacts 36 and impresses the voltage from line $L_1$ to neutral N via line 35 across a chain of resistances comprising dropping resistor R10, the cathode heaters 53—54 for the tubes 51, 52 and 34, and resistors R7, R8 and R9.

As has already been pointed out, the resistors R7, R8 and R9 are intended to impress a nominally constant voltage across the corners I—II of bridge I—II—III—IV and in the interest of such constancy the current through them is made large relative to that flowing in the bridge arms. The potential difference between corners III—IV of the bridge is impressed, in series with the bias voltages in resistors R3 and R9, between the grid and cathode of tube 52. The movable tap 50 on resistor or potentiometer R6, which tap is corner IV of the bridge, is connected to control knob 21, so that its position is determined by setting the latter.

It is possible in ways well known in the electrical art to so proportion the resistors R7, R8, R9, R11 and R12, and to so set the tap 50 on potentiometer R6 that the bridge may be balanced for any given value of the thermal resistor 42, and no potential difference then exists between bridge corner III and its diametrically opposite corner IV. Under such balanced conditions, this equality of potential at the above-mentioned corners will exist over a substantial range of variation in the voltage of supply lines $L_1$, N, $L_2$.

Suppose now that control knob 21 is moved clockwise from the "off" position to that corresponding to a temperature below boiling. The position of the movable tap 50 on potentiometer R6 has been moved clockwise (in Fig. 4), making less positive the corner IV of the bridge. Since, however, the cooking utensil 41 has not immediately risen in temperature, the resistance of the thermal resistor 42 has not yet decreased, so that the potential at the corner III has not yet decreased, and the grid of the tube 52 is positive relative to the cathode and produces plate current saturation. This produces a large voltage-drop in resistor R13, which makes the grid of tube 51 negative relative to its cathode and keeps it non-conductive. Tube 34 is of such type that, with no current flow in its grid-resistor R15, it is fully conductive and holds switch 31 closed to energize heater 20.

As the utensil 41 is heated by the heater 20, the temperature of the thermal resistor 42 rises and its resistance drops, thereby reducing the potential at the corner III. As the grid of the tube 52 becomes less positive and then negative relative to the cathode, conduction of the tube 52 decreases, thereby decreasing the voltage drop in resistor R13 and making the grid of the tube 51 less negative. The conduction of the tube 51 thus increases and makes the grids of the tube 34 less positive, so as to reduce conduction through the tube 34 until it is insufficient to energize the relay 32, whereupon the switch 31 is opened to discontinue the supply of heat to the utensil.

Power remains cut off from the heater 20 until the temperature of the thermal resistor 42 falls, raising its resistance and increasing the potential at the corner III. This makes the grid more positive and increases conduction of the tube 52, increasing the voltage drop in resistor R13 and making the grid of the tube 51 somewhat more negative. Conduction through the tube 51 thereupon decreases, thereby decreasing the voltage drop in resistor R15 and making the grids of the tube 34 more positive. Conduction through the tubes 34 increases until the current is sufficient to energize the relay 32 to close the switch 31. Thus the heater 20 is alternately turned on and off at periods such as to maintain the cooking utensil at the temperature corresponding to the setting of control knob 21.

If control knob 21 is then turned further clockwise, the potential of the cathode of tube 52 is correspondingly lowered, and the resistance of the thermal resistor 42 must be lessened before the grid of tube 52 can fall to the cut-off potential. The heater 20 will thus continue to carry current until the temperature of the cooking utensil has risen to the higher temperature which corresponds to the reduced resistance of the thermal resistor which will balance the bridge for the new control knob setting.

As long as the cycling switch 58, 59 remains open or inactive, it will thus be evident that, to every setting of the control knob 21 and thus to every displacement of the slider on potentiometer R6, there corresponds a particular temperature at which cooking utensil 41 will be maintained. A scale may thus be printed on control knob 21 showing the displacement corresponding to any heater temperature. As previously stated, the attainment of a reasonable uniformity of calibration over this scale presents a problem. Certain factors entering into determination of the magnitudes of the resistors composing the circuits will now be discussed.

The grid bias at cut-off in electron tubes of commercial types for control service may be of the order of one percent of the supply line voltage; hence the bridge circuit supplying this cut-off voltage may have a supply voltage much smaller than line voltage. It is possible to economize circuitry therefore by supplying the bridge circuit with the heater current supplied for the cathodes 53, 54 of the electron tubes from the leads 35 and N through a dropping resistor R10. This heater current is of the order of 0.15 ampere, a value large compared with ordinary voltage amplifier tube currents, and we send it through a chain of resistors R7, R8, R9 aggregating some 52.4 ohms to impress, at nominal line voltage of 220, about 8.0 bolts across the corners I—II of the bridge.

One particular type of commercially satisfactory thermal resistor has a resistance of some 50,000 ohms at 100° F., dropping to about 6,000 ohms at 212° F., the boiling point of water, and to about 325 ohms at 450° F. The 8-volt potential difference of the bridge will be impressed across this thermal resistor in series with the resistor R9, the variable resistor R11 and resistor R12. As previously stated, it is desirable that the current in resistors R7, R8, R9 be large relative to the current in the arms of bridge I, II, III, IV. This condition will be met if R11, R12 are of the order of a thousand ohms. We have chosen resistor R12 of 1500 ohms and a variable resistor R11 of 500 ohms to make the sensitivity comparable at both ends of the scale on control knob 21, and because, if their resistances were too small, the wattage dissipated in thermal resistor 42 would be undesirably great. For analogous reasons we have chosen a 10,000 ohm value for potentiometer R6.

It is desirable for commercial reasons that the temperature range for which the cooking utensil may be preset to operate shall extend from about 100° F. to about 450° F. and that this range should be covered within the scale on the periphery of the control knob. The bridge system is accordingly designed for a scale from 100° F. to near the boiling point of water, in its first segment or zone; then to cover the boiling range in which the cycling switch controls the heater wattage over the second segment or zone of the control knob; and then to cover the temperature range from about 212° F. to about 450° F. in the third segment or zone of the control knob.

At the lowest setting of 100° F. the control knob has, as previously described, energized the electron tubes and their control circuit and positioned the sliding contact on potentiometer R6 at the upper end thereof. At 100° F. the resistance of the thermal resistor 42 is about 50,000 ohms and, if the resistors R11, R12 aggregate from 1500 to 2000 ohms, practically the full voltage between corners I and II of the bridge is impressed across the thermal resistor 42, and so is impressed between the grid of tube 52 and the grounded neutral N.

When the control knob 21 presets the slider on potentiometer R6 at its lower end for a bridge balance at around 450° F. and the utensil 41 is heated to that temperature, the thermal resistor 42 will fall in resistance, to about 325 ohms, and the bridge terminal III will be at a potential of only about $$\frac{325}{325+R11+R12} = \frac{14}{100}$$

of the voltage of bridge terminal I above grounded neutral N; i. e., at about 1.1 volts. To balance the bridge and cause heater current cut-off at this temperature, the potential of terminal IV must also be 1.1 volts. It will thus be evident that the lower end of resistor or potentiometer R6, on which the sliding terminal is set, cannot be connected to grounded neutral N. Hence, a resistor R5 is provided to interpose an IR drop, raising the potential of the slider IV to the desired value; but a moment's consideration will show that this IR drop will be a minor fraction of that in R6.

The resistor R2 is needed, of course, to separate the slider on potentiometer R6 in potential from the grounded neutral N, just as resistor R4 is needed to separate it in potential from line lead 35. The determination of the desired values of resistors R2, R4 and R5 will be discussed further below.

The midpoint of the potentiometer is connected to the junction between the resistors R7 and R8, and the resistance of the resistor R7 is proportioned to the resistance of the resistors R8 and R9 so as to produce a potential at the midpoint of the potentiometer which, when the slider engages the same, provides a temperature setting or calibration of the control which is just below the boiling point, for example, 204° F. In the present embodiment, this potential is 6.8 volts. The resistance of the resistor R1 is chosen so that, with the slider 50 on the midpoint and the switch 58, 59 closed, the potential on the cathode 52 is reduced sufficiently to provide a temperature setting or calibration just above the boiling point, for example, 235° F.

As the slider 50 is moved clockwise from "Off" and into engagement with the upper end of the potentiometer R6, it is subjected to the voltage existing at the corner I, namely, 8 volts in the example given. This provides the lowest temperature setting, in this case, 100° F. As the slider 50 is moved clockwise, the potentiometer interposes resistance between the corner I and the slider. It will be noted that current flows from the slider to corner II of the bridge through resistor R2 and that current is flowing also from the slider to the junction of resistors R7, R8 through the potentiometer itself. The magnitude of the respective currents in these branches are fixed by Kirchhoff's laws and may be calculated by applying the equations given below to the resistor network of Fig. 4 in the manner there explained. Such calculations will show that this clockwise movement results in reducing the potential at the slider and thereby raising the temperature setting. As the slider is moved further in clockwise direction it will be found that, with resistors of the values described below in the branches of the network, the potential of the pointer drops and finally reaches 6.8 volts at the R7, R8 junctions. It will be noted that the currents flowing into the slider 50 from the two portions of potentiometer 6, lying respectively above and below the slider, combine to give the current to resistor R2. Thus, as the slider is moved clockwise through the "Boil" zone, the change in current flow from the midpoint junctions R7, R8 tends to compensate for the decrease in current flowing from the corner I, thereby tending to maintain the potential of the slider 50 substantially constant, as represented by that portion of curve A in Fig. 1 which is generally horizontal. As the slider reaches the midpoint, it is subjected directly to the potential of 6.8 volts at that point. The above holds true for that portion of each cycle of the cycling switch 58, 59 during which the switch is open.

During that part of each cycle that the switch is closed, the resistance R1 reduces the potential at the cathode of the tube 52, and thereby effects an increased temperature setting or calibration. The variation in temperature setting, with the cycling switch closed, occurring upon movement of the pointer through the "Boil" zone is indicated by that portion of the curve B which is generally horizontal and parallel to the generally horizontal portion of the curve A.

As the slider 50 is moved clockwise beyond the midpoint, the switch 58, 59 is maintained continuously closed. Also, the slider is moved clockwise beyond the mid-point, the potentiometer R6 interposes increasing resistance between the midpoint and the slider, so that the potential in the slider gradually decreases below 6.8 volts and correspondingly raises the temperature setting. A graph showing the relation of potential of slider 6 to its angular position is a curve which counterbalances, to a substantial degree, the curvature of the graph in Fig. 5, so that the resultant line representing change in temperature setting upon movement of the knob is more nearly straight, as represented by the rising portion of the line B of Fig. 1.

Potentiometer R6 is of such high resistance (10,000 ohms) compared to resistors R7, R8, R9 (totaling 52 ohms) that the potential of the fixed mid-tap is not altered appreciably by any movements of slider 50. The resistor R5 may be about one-eighth of the value of resistor R6 in the circuit here detailed.

Summarizing briefly a boiling operation: Assume that a utensil containing water at room temperature is placed on the heater 20 and that the control knob is moved from the "Off" position to a "Boil" position, such as the "L" or low position. Such movement of the knob closes the switch 36 to energize the network and also to energize the motor 56 for continuous operation of the switch 58, 59. The cam 61 is positioned to effect closing of the switch 58, 59 during a small portion of each cycle and the slider 50 is positioned to provide a temperature slightly below boiling when the switch 58, 59 is open and a temperature slightly above boiling when the switch is closed.

As long as the temperature of the thermal resistor 42 is below either temperature setting, the heater 20 is continuously energized by operation of the control, in the manner already described, to bring the utensil up to boiling temperature as quickly as possible. As soon as the temperature of the resistor 42 reaches the temperature for which the control is calibrated or set during the open periods of the cycling switch, the heater 20 will be deenergized during such open period of the cycling switch. During the "On" period of the switch, the temperature of the resistor 42 will be below the calibration temperature of about 235° F., so that the heater 20 will be energized during such "On" period. Therefore, as long as water remains in the utensil to prevent rise in temperature above boiling, the heater will be energized during a portion of each cycle of operation of the cycling switch to maintain an average wattage determined by the exact setting within the "Boil" zone.

However, if the utensil is not receiving sufficient heat to maintain boiling temperature, for example, if a large utensil has been placed on the heater and the knob set at a very low rate of boil, then, as soon as the temperature of the resistor 42 drops below the low calibration temperature of 204° F., the heater is also energized during the "Off" period of the cycling switch, thereby providing continuous energization of the heater 20 to bring the temperature back up to the lower calibration temperature.

In the event that all the water is boiled away and the utensil becomes dry and the temperature rises above the upper calibration temperature, then the temperature of the resistor 42 will be above both calibration temperatures and the control will deenergize the heater during both the "On" and the "Off" period of the cycling switch to prevent any further rise in the temperature of the utensil.

The foregoing describes a design of control network useful for many purposes other than the electric range control to which it is here applied in that it approximates any desired correlation between displacements of a control member and variations of a voltage at a pair of output terminals.

If the thermal resistor 42 formed one arm of a simple unmodified Wheatstone bridge circuit and its balance-point were varied in value by turning a control-knob, it would be found that the calibration scale of the control-knob would be far from uniform, and would be badly crowded in some places. A number of different ways, beside the one we have herein adopted, may be devised to avoid this unsatisfactory situation; but they would all have characteristics which we will now point out.

In the case of any network of circuit elements, of which the resistors we employ are exemplary, the voltage between a terminal, movable along one branch, and a fixed terminal will vary with displacement of the movable terminal; but whatever the form of the network the correlation between displacemnet of the movable terminal and its potential relative to a fixed point in the network may be expressed in an equation involving the circuit parameters by applying Kirchhoff's laws. This equation could be put into the form.

(1)
$$x=f_1(V)$$

where V is the voltage, relative to any fixed point of the network, of the movable terminal; $x$ is the displacement of the latter. This equation could therefore be written for the voltage between the movable tap on potentiometer R6 and the grounded neutral N of such a circuit as that in Fig. 4.

The resistance of the thermal resistor 42 may also be correlated with its temperature T by a known equation expressing the relation indicated by Fig. 5. Thus the potential V, relative to grounded neutral N, of any fixed point such as the junction III between the thermal resistor 42 and resistor R11 may be expressed as (2)
$$V_1=f_2(T)$$

Since, at balance on a bridge, $V=V_1$, Equations 1 and 2 may be combined in (3)
$$x=f_1[f_2(T)]$$

an equation which expresses the required displacement $x$ of the movable terminal as a function of temperature T of thermal resistor 42.

The condition of linearity in the relationship of $x$ to T will be attained if $$\frac{d^2x}{dT^2}=0$$

throughout the range of operation over which linearity is desired. That is to say, all networks which will yield a substantially uniform calibration for the adjustable resistor will have the characteristic that the second derivative on the curve connecting resistor setting with temperature of the temperature-variable element is substantially zero over the temperature ranges in which the linear control is to be applied.

The problem of developing a suitable network for the balance-resistor may, however, be aproached from another angle. Equation 2 shows the value which the potential of the slider on potentiometer R6 must have for each value of Thermistor temperature T and since the desired calibration curve for the control knob 21 shows the value of $x$ for each value of T, the value of V for each value of $x$ is thus determined. The problem of devising a network having this required relationship or curve between V and $x$ is thus presented.

Kirchhoff's laws applied to a network of any number of branches, $n$, will present $n$ simultaneous equations, involving the resistances of the $n$ branches as parameters; and these may be solved for the voltage between any two points yielding an equation involving these $n$ resistances. Thus if a network of $n$ resistors were used in our modified bridge circuit, the values of $n$ resistances, one in each branch of the net (including the resistance corresponding to any setting the control knob 21), would have to be substituted in an equation to get the voltage V between the slidable terminal on potentiometer R6 and the grounded neutral N. Thus for any selected value of $x$ the desired calibration curve (Fig. 1) gives a value of T and Equation 2 gives a corresponding numerical value of $V_1=V$. This value of V may be substituted in the equation involving the $n$ resistances.

If now the $n$ resistances were treated as $n$ unknown quantities (e. g., as $x$, $y$, $z$, etc.) in that algebraic expression for the voltage V, it would be possible to write a set of $n$ consistent solvable equations by substituting any $n$ values of V corresponding to $n$ selected values of $x$ for V in the equations last mentioned. These $n$ simultaneous equations could be solved to evaluate the respective resistances of the $n$ branches. In this way, any curve between $x$ and T can be approximated by using a net of numerous branches. The larger the number $n$ of the branches, the better will the approximation be.

Corresponding to this principle we use a network embodying a bridge, but having much more than the four arms of a simple Wheatstone bridge.

With the potential above grounded neutral N of both the mid-tap and the upper end of potentiometer R6 thus fixed at about 6.8 volts and 8 volts respectively, it is possible to write an equation giving the potential V of slider 50 in terms of its position $x$ on the upper half of potentiometer R6 in terms of the unknown resistances of resistors R2, R3, R4 and R5. It is also possible to determine from the curve of Fig. 5 the potential relative to neutral N which the corners III and IV must have to balance the bridge and cause cut-off for the temperature corresponding to these same values of $x$ on curve A in the desired calibration curve for Fig. 1. For any given value of $x$ the potential for corner IV may be substituted in the above-mentioned equation. By doing this for three positions $x$ on curve A, three simultaneous equations involving the three unknowns R2, R3 and R4 may be written, and solved to obtain the values of those resistances which will produce a curve having the same voltages at those three values of $x$ as curve A, and so approximating that desired curve.

The nearly straight rising portion of curve B of Fig. 1 represents operation of the system at values of $x$ beyond mid-point on the control-knob; it therefore represents operation with switch 58—59 closed and resistor R1 shunted across resistors R2 and R3. Two more equations involving resistors R1 through R5 can be written giving the voltage at terminal IV for any value of $x$ corresponding to positions of that terminal below the mid-tap on potentiometer R6. The potential at corners III and IV for bridge-balance at any temperature corresponding to $x$ can again be found by using curve 5 and substituting in the new equations. Thus a fourth and a fifth equation involving R2, R3, R4, R5 and R1 will be obtained by selecting two points on curve B if three equations were written for curve A. On the other hand, three points on curve B may be selected if only two values of $x$ and two equations were written for curve A. Anyway, five equations result which may be solved for the five unknown resistances R1 through R5 which will result in curves coinciding with A and B at five points (in addition to $x=0$ and $x=$ midscale on the dial which are fixed by voltages taken from resistor chain R7, R8, R9). The curves obtained will approximate curves A and B at other values of setting $x$.

By adding additional branches to the control network and obtaining more unknown resistors and equations involving them to express voltage at slider 50, a larger number of points of coincidence on curves A and B may be attained, with correspondingly closer approximation to those curves at other points. As an example of such an additional branch, a resistor might be connected between any tap-point on the portion of potentiometer 6 below its mid-point and the bridge corner II. For some purposes sufficient approximation is attainable with fewer than five points of coincidence with curves A and B; in such cases one or more of the unknown resistors may be fixed in value arbitrarily.

In particular, we have noted one type of network which is useful for many purposes, particularly those where it is desired to derive a temperature calibration which changes nearly linearly with displacements over one range of the scale but changes less or not at all over another range. In a simple uniform potentiometer, voltage changes linearly with displacements of the slider. However, if a resistor of magnitude about equal to half that of the potentiometer 6 is connected between the slider and the lower end thereof, or to a point of fixed low potential relative to that end, the slider potential will change more rapidly with the displacement of the slider at the end remote from the low potential point, but will vary less rapidly with displacements as the mid-point is approached. The potential between the output terminals of the bridge will vary in accordance with variations in the potential of the slider, provided that the temperature of the variable impedance 42 remains substantially constant during the adjustment of the slider. If the added resistor is of the right value, the slider potential curve may even pass through a minimum at one point along the potentiometer. This modification of an ordinary potentiometer furnishes a sufficiently good approximation in the production of scale linearity for many practical purposes.

It may be noted that resistor R2 helps to provide a substantially constant change in temperature setting for a given movement of the knob throughout the "Fry" zone; in other words, to make the inclined portion of the graph B of Fig. 1 as straight as possible, in the following manner: The slider 50 moves from the mid-tap downwardly or in clockwise direction to the high temperature or lower end of the potentiometer R6 upon movement of the knob from the low temperature end of the "Fry" zone toward the high temperature end. At the mid-tap, the potentiometer is subjected to a voltage of 6.8 volts. If the resistor R2 were not provided, upon such movement of the slider 50, the drop in potential of the slider would be proportional to its movement, since the change in resistance through the lower end of the potentiometer and the resistor R5 would be proportional to such movement. With the resistor R2 connected as shown in Fig. 4, the slider 50 is at 6.8 volts at the mid-tap, but as it moves downwardly from the mid-tap, the effective resistance between the slider 50 and the corner II of the bridge is substantially reduced by the resistor R2, since the current is about equally divided between the resistor R2, and the potentiometer and the resistor R5. As the slider moves toward the lower end, however, the resistance through the small remaining portion of the potentiometer and the resistor R5 becomes small in relation to the resistance of R2, so that the latter has less effect upon the voltage of slider 50. Thus, during the first portion of the movement of the slider 50 through the "Fry" zone, a given movement of the pointer provides the greater change in voltage required for a given change in temperature of the resistor 42 at the low temperature end of the "Fry" zone, and as it approaches the high temperature end, a given movement provides the smaller change in voltage required for a given change in temperature of the resistor 42 at the high temperature end.

It may be noted that the curvature thus imparted to the graph connecting potentiometer tap displacement with tap voltage acts also to neutralize the effect of the curvature of the temperature-resistance curve of Fig. 5 on non-linearity of the rising portion of branch B in Fig. 1.

The variable resistor R11 makes it possible, in effect, to displace the calibration scale so that "boiling" on the control knob may correspond to temperatures other than 212° F., an adjustment which may sometimes be desired; and also to adjust the apparatus to operate with thermal resistors and other components which vary somewhat from sample to sample as purchased on the market.

One set of values of the resistors and capacitors which has been found to operate satisfactorily in the Fig. 4 network is:

| | | |
|---|---|---|
| R1 | ohms | 20,000 |
| R2 | do | 5,600 |
| R3 | do | 1,600 |
| R4 | do | 330,000 |
| R5 | do | 1,300 |
| R6 | do | 10,000 |
| R7 | do | 45 |
| R8 | do | 4.2 |
| R9 | do | 3.2 |
| R10 | do | 650 |
| R11 | do | 500 |
| R12 | do | 1,300 |
| R13 | megohms | 1 |
| R14 | do | 1 |
| R15 | do | 1 |
| C1 | mf | 0.01 |
| C2 | mf | 0.01 |
| C3 | mf | 0.01 |
| Tube 51, 52 | | Type 12AX7 |
| Tube 34 | | Type 12AU7 |

The control knob 21 may be indexed as shown in Fig. 4 and a marker provided on the range casing so that, when the knob 21 is turned to bring one of the indicia e. g. 320° in the frying range, into register with the marker, the potentiometer slider 50 will be resting at a point on potentiometer R6 which causes the bridge to balance at a temperature of 320° F. The range of control knob 21 positions in which the cam 58 causes periodic closure of switch contacts 58, 59 is marked "Boil," and is subdivided into sections H, M, L and S meaning "high," "medium," "low" and "simmer."

Figure 6:
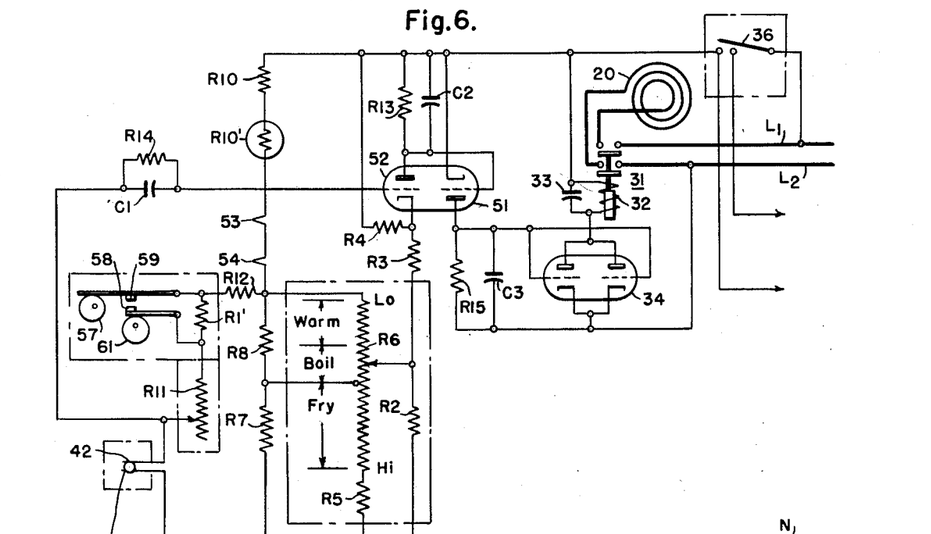
Fig. 6 is a schematic view of an alternative form which the control circuit of Fig. 4 may take, and indicating the grouping of various circuit elements in one actual embodiment of our invention which has been made.
Figure 7:
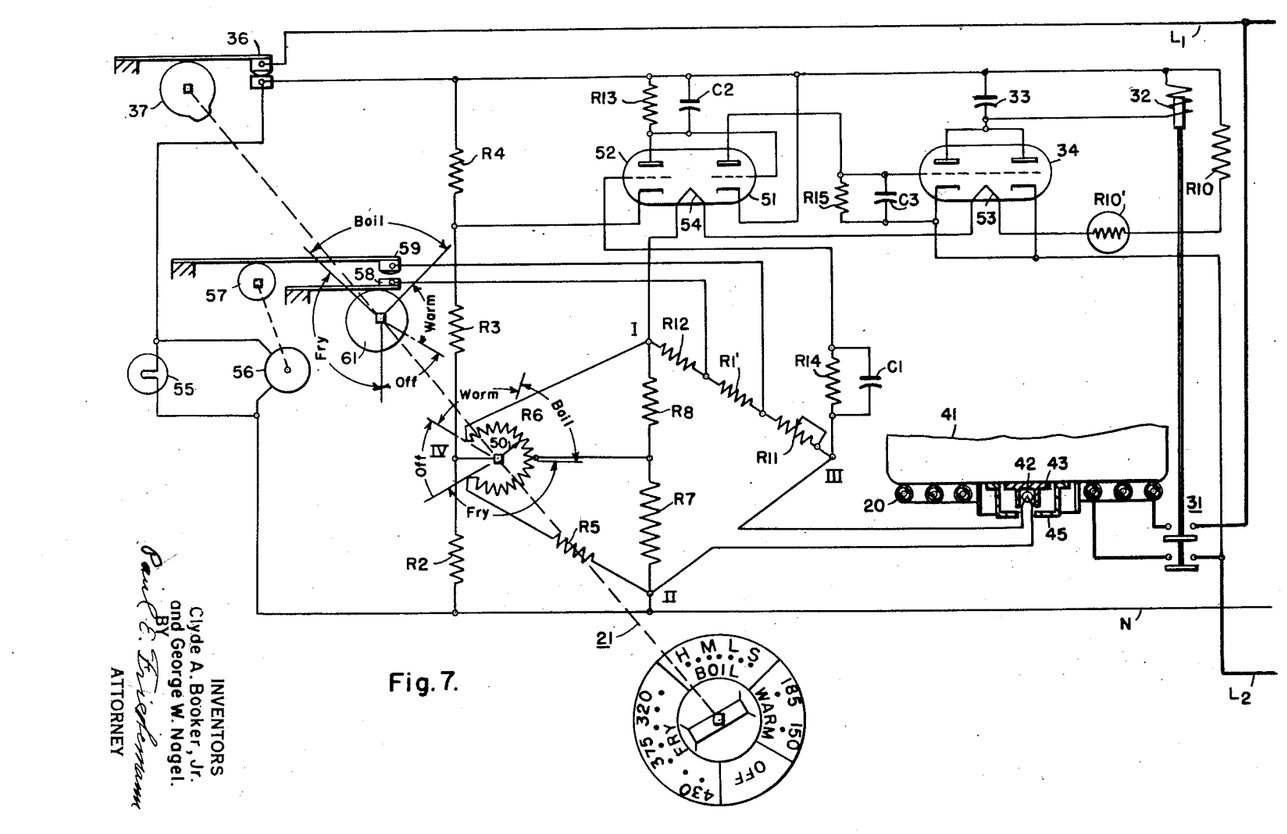
Fig. 7 is a schematic view of the circuit of Fig. 6 arranged in a way which is believed to bring out a little more clearly the relationship of various branches thereof.

Another embodiment of the principles of our invention is shown in Figs. 6 and 7. In it the various elements have been given the same reference numerals as elements in Fig. 4 performing the same functions, primed numerals being used where the correspondence is not complete.

There are two differences. The first is the addition of a ballast resistor or voltage regulator R10' to the circuit supplying potential to the corner I—II, thus providing a circuit which extends from lead 35 through resistor R10, ballast resistor R10', heaters 53, 54 and the resistors R7 and R8. The ballast resistor R10' operates in a manner known in the art, tending to maintain the current flow, and thereby the potential across the corner I—II, substantially constant upon fluctuations in voltage across the conductors L1—N.

The other change comprises the intercalation of a resistor R1' in the bridge arm I—III, in place of the resistor R1 of Fig. 4, as a means for changing the temperature calibration or setting for the boiling operation. In this embodiment, the resistances are proportioned with the resistor R1' connected in the circuit for obtaining the graph A of Fig. 1. The resistor R1' is short circuited by the switch 58, 59 to provide the graph B of Fig. 1. Shorting out the resistor R1' raises the potential of the corner III and makes the grid of the tube 52 more positive to increase the temperature setting, thereby producing the same effect as lowering the potential of the cathode of the tube 52 by connecting the resistor R1 in parallel with the resistors R2 and R3 in the embodiment in Fig. 4. It will be noted that resistor R9 in Fig. 4 has no counterpart in Fig. 7.

The leg II—III of the bridge comprises a thermal resistor 42 of the same type as described for Fig. 4 and which is, like the latter, positioned in good thermal contact with the cooking utensil. The leg I—III of the bridge modifies Fig. 4 in that the intermittently switched resistor R1' is connected in series with resistors R11 and R12 instead of shunting the resistors R2, R3 on the opposite side of the bridge in Fig. 4. The contacts 58, 59, intermittently opened and closed by a motor-driven cam 57, alternately connect resistor R1' into and out of arm I—III of the bridge thereby shifting operation between two calibration-curve branches A and B just as did the shifting of R1 in and out of the Fig. 4 network.

The resistors R1 and R12 are proportioned by the same principles applied to the network of Fig. 4, to produce the same characteristic connecting control-knob rotation with utensil temperature that appears in Fig. 1.

A set of values of the resistors and capacitors which has been found to operate satisfactorily in the Fig. 7 network is:

| | | |
|---|---|---|
| R1' | ohms | 1,200 |
| R2 | do | 6,200 |
| R3 | do | 1,200 |
| R4 | do | 270,000 |
| R5 | do | 1,800 |
| R6 | do | 10,000 |
| R7 | do | 47 |
| R8 | do | 12 |
| R10 | do | 250 |
| R11 | do | 2,000 |
| R12 | do | 1,000 |
| R13 | megohms | 1 |
| R14 | do | 1 |
| R15 | do | 1 |
| C1 | microfarads | 0.02 |
| C2 | do | 0.02 |
| C3 | do | 0.02 |
| Tube 51—52 | | Type 12AX7 |
| Tube 34 | | Type 12AU7 |

In Fig. 6 the dash-dot lines surround circuit elements which it has been found desirable to mount closely together in one commercial embodiment of our invention as facilitating manufacture thereof.

We claim as our invention:

1. In a heating device, a heater and control means therefor comprising an electrical circuit element having a control electrode, said element acting to cut off power to said heater when a predetermined potential is applied to its control electrode, a bridge circuit provided with a voltage supply and comprising a first bridge-arm which embodies a first resistor, a second bridge-arm which embodies a thermal resistor positioned to be in thermal contact with a load for said heater, said first and second bridge-arms being joined, and two other arms comprising the respective sections of a potentiometer which are on opposite sides of a contact movable on said potentiometer, a calibrated control-handle moving said contact, a second resistor connecting said contact to the bridge corner which is between said potentiometer and said thermal resistor, connections including the potential difference between said contact and the junction of said first and second bridge arms in the control electrode circuit of said element, means for impressing on an intermediate point on said potentiometer a potental equal to that assumed by said junction when said thermal resistor is at the boiling point of water, a bias voltage also included in said control-electrode circuit, and switching means which varies said bias voltage between a lower and a higher value only when said movable contact is positioned near said intermediate point.

2. Control means for an electric heater comprising an electrical circuit element having a control electrode, said element acting to cut off power to said heater when a predetermined potential is applied to its control electrode, a bridge circuit provided with a voltage supply and comprising a first bridge-arm which embodies a first resistor, a second bridge-arm which embodies a thermal resistor, said first and second bridge-arms being joined, and two other arms comprising the respective sections of a potentiometer which are on opposite sides of a contact movable thereon, a calibrated control-handle moving said contact, a second resistor connecting said contact to the bridge corner which is between said potentiometer and said thermal resistor, connections including the potential difference between said contact and the junction of said first and second bridge arms in the control-electrode circuit of said element, and means for impressing on an intermediate point on said potentiomter a potential equal to that assumed by said junction when said thermal resistor is at the boiling point of water.

3. In a heating device, a heater and control means therefor comprising an electrical circuit element having a control electrode, a bridge circuit provided with a voltage supply and comprising a first bridge arm which embodies a first impedance, a second bridge arm which embodies a thermal impedance positioned to be in thermal contact with a load for said heater, said first and second arms being joined, and two other arms comprising the respective sections of a network which are on opposite sides of a contact movable thereon, a calibrated control-handle having a predetermined range of movement for moving said contact, the impedances composing said network being so proportioned that the potential difference between said contact and the junction between said first and second bridge arms varies slowly during one part of the movement of said control-handle and substantially more rapidly during a second part of said movement, and a connection including said potential difference in the control electrode circuit of said element.

4. Control means for a heater comprising an electrical circuit element having a control electrode, a bridge circuit provided with a voltage supply and comprising a first bridge arm which embodies a first impedance, a second bridge arm which embodies a thermal-responsive impedance, said first and second arms being joined, and two other arms comprising the respective sections of a network which are on opposite sides of a contact movable thereon, a calibrated control-handle having a predetermined range of movement for moving said contact, the impedances composing said network being so proportioned that the potential difference between said contact and the junction between said first and second bridge arms varies slowly during one part of the movement of said control-handle and substantially more rapidly during a second part of said movement, a connection including said potential difference in the control electrode circuit of said element, a bias voltage also included in said control-electrode circuit, and switching means which varies said bias voltage periodically between a lower and a higher value only during said first part of said movement.

5. Control means for a heating device comprising an electrical circuit element having a control-electrode, said element acting to cut off power to said heating device when a predetermined potential is applied to its control electrode, a bridge circuit provided with a voltage supply and comprising a first bridge arm which embodies a first impedance, a second bridge arm which embodies a thermal impedance, said first and second arms being joined, and two other arms comprising the respective sections of a network which are on opposite sides of a contact movable thereon, a calibrated control-handle having a predetermined range of movement for moving said contact, the impedances composing said network being so proportioned that the potential difference between said contact and the junction between said first and second bridge arms varies little during one part of the movement of said control-handle and substantially more rapidly during a second part of said movement, and a connection including said potential difference in the control electrode circuit of said element.

6. A temperature control device comprising a bridge having a channel comprising a thermal impedance in series with a first impedance forming one pair of adjacent arms of said bridge, a second impedance in series with a potentiometer having a slider shunting said channel and forming the third and fourth arms of said bridge, a voltage source having its terminals connected to the terminals of said channel, a third impedance connected in shunt with the bridge arm between said slider and the end of said channel which is adjacent said thermal impedance, said second impedance being located in the arm shunted by said third impedance, and a grid-controlled device having the voltage between said slider and the common junction of said thermal impedance with said first impedance connected in its control grid circuit.

7. A temperature control device comprising a bridge having a channel comprising a thermal impedance in series with a first impedance forming one pair of adjacent arms of said bridge, a second impedance in series with a potentiometer having a slider shunting said channel and forming the third and fourth arms of said bridge, said second impedance having a junction with said thermal impedance, a voltage source having its terminals connected to the terminals of said channel, a third impedance connected between said slider and the end of said channel which is adjacent said thermal impedance, a grid-controlled device having the voltage between said slider and the common junction of said thermal impedance and said first impedance connected in its control-grid circuit, and means to fix the potential of an intermediate point on said potentiometer relative to one terminal of said source.

8. A temperature control device comprising a bridge having a channel comprising a thermal impedance in series with a first resistor forming one pair of adjacent arms of said bridge, a second impedance in series with a potentiometer having a slider shunting said channel and forming the third and fourth arms of said bridge, said second impedance having a junction with said thermal impedance, a voltage source having its terminals connected to the end terminals of said channel, a third impedance connected between said slider and the end of said channel which is adjacent said thermal impedance, a grid-controlled device having the voltage between said slider and the common junction of said thermal impedance and said first impedance connected in its control-grid circuit, means to fix the potential of an intermediate point on said potentiometer relative to one terminal of said source, and means to periodically vary a bias voltage in said control-grid circuit.

9. In combination with a heater means, means to reduce its heating effect in response to impressing a predetermined voltage attained by a control device on a pair of control terminals, said control device comprising a bridge circuit having a voltage impressed on its input terminals, a first channel between said input terminals comprising a first impedance in series with a temperature-variable impedance which is positioned to be in thermal contact with a load for said heater means, a second channel between said input terminals, comprising a potentiometer having a movable tap, a shunting impedance connected between said movable tap and the end of said second channel adjacent said temperature-variable impedance, and means for impressing on said control terminals the potential difference between said movable tap and the junction of said first impedance with said thermal impedance.

10. In combination with a heater means, means to reduce its heating effect in response to impressing a predetermined voltage attained by a control device on a pair of control terminals, said control device comprising a bridge circuit having a voltage impressed on its input terminals, a first channel between said input terminals comprising a first impedance in series with a thermal impedance which is positioned to be in thermal contact with a load for said heater means, a second channel between said input terminals comprising a potentiometer having a movable tap, a shunting impedance connected between said movable tap and the end of said second channel adjacent said thermal impedance, said shunting impedance having an ohmic value about half that of said potentiometer, and means for connecting in circuit between said control terminals the potential difference between said movable tap and the junction of said first impedance with said thermal impedance.

11. In combination with a heater means, means to reduce its heating effect in response to impressing a predetermined voltage attained by a control device on a pair of control terminals, said control device comprising a bridge circuit having a voltage impressed on its input terminals, a first channel between said input terminals comprising a first impedance in series with a thermal impedance which is positioned to be in thermal contact with a load for said heater means, a second channel between said input terminals, comprising a second impedance in series with a potentiometer having a movable tap, a shunting impedance connected between said movable tap and the end of said second channel adjacent said thermal impedance, and means for impressing on said control terminals the potential difference between said movable tap and the junction of said first impedance with said thermal impedance.

12. In combination with a heater means, means to reduce its heating effect in response to impressing a predetermined voltage attained by a control device on a pair of control terminals, said control device comprising a bridge circuit having a voltage impressed on its input terminals, a first channel between said input terminals comprising a first impedance in series with a thermal impedance which is positioned to be in thermal contact with a load for said heater means, a second channel between said input terminals comprising a potentiometer having a movable tap in series with a second impedance, a shunting impedance connected between said movable tap and the end of said second channel adjacent said thermal impedance, said shunting impedance having an ohmic value about half that of said potentiometer, and said second impedance having an ohmic value about one-eighth that of said potentiometer, and means for connecting in circuit between said control terminals the potential difference between said movable tap and the junction of said first impedance with said thermal impedance.

13. In a heater means, means to reduce its heating effect in response to impressing a predetermined voltage attained by a control device on a pair of control terminals, said control device comprising a bridge circuit having a voltage impressed on its input terminals, a first channel between said input terminals comprising a first impedance in series with a thermal impedance which is positioned to be in thermal contact with a load for said heater means, a second channel between said input terminals comprising a contactor for deriving a fraction of the voltage between the ends of said second channel which varies in response to movement of a control-knob, means for impressing on said control terminals the sum of a bias voltage and the potential difference between said contactor and the junction between said first impedance and said thermal impedance, and means for altering the value of said bias voltage over a part of the range of movements of said control-knob, said last mentioned means being rendered inactive by movement of said control-knob over another part of its range of movements.

14. In a heater means, means to reduce its heating effect in response to impressing a predetermined voltage attained by a control device on a pair of control terminals, said control device comprising a bridge circuit having a voltage impressed on its input terminals, a first channel between said input terminals comprising a first impedance in series with a thermal impedance which is positioned to be in thermal contact with a load for said heater means, a second channel between said input terminals comprising a contactor for deriving a fraction of the voltage between the ends of said second channel which varies in response to movement of a control-knob, means for impressing on said control terminals the sum of a bias voltage and the potential difference between said contactor and the junction between said first impedance and said thermal impedance, and means for altering the value of said bias voltage over a part of the range of movements of said control-knob, the last-mentioned means altering said bias voltage periodically between two predetermined values during one part of said range, while leaving it at one of said two values during a second part of said range and at the other of said two values during a third part of said range.

15. In a heater means, means to reduce its heating effect in response to impressing a predetermined voltage attained by a control device on a pair of control terminals, said control device comprising a bridge circuit having a voltage impressed on its input terminals, a first channel between said input terminals comprising a first impedance in series with a thermal impedance which is positioned to be in thermal contact with a load for said heater means, a second channel between said input terminals comprising a contactor for deriving a fraction of the voltage between the ends of said second channel which varies in response to movement of a control-knob, means for impressing on said control terminals the sum of a bias voltage and the potential difference between said contactor and the junction between said first impedance and said thermal impedance, and means for altering the value of said bias voltage over one part of the range of movements of said control-knob, the said fraction of the voltage varying only slowly in response to movements of said control-knob during said one part of said range but varying substantially more rapidly during another part of said range.

16. In combination with a heater for cooking, a switch in circuit with said heater, an electrical discharge device which, at all times when conductive, holds said switch in closed position, and control means responsive to a load temperature maintained by said heater and covering a boiling range and temperatures outside said boiling range, said control means rendering said device non-conducting whenever said load attains or exceeds a predetermined temperature when preset outside said boiling range and intermittently rendering said device conducting and non-conducting to periodically open and close said switch when pre-set within said boiling range and said load is at its boiling temperature.

17. In combination with a heater for cooking, a switch in circuit with said heater, an electrical discharge device which, at all times when conductive, holds said switch in closed position, and control means responsive to a load temperature maintained by said heater and covering a boiling range and temperatures outside said boiling range, said control means rendering said device non-conducting whenever said load attains or exceeds a predetermined temperature when preset outside said boiling range and intermittently rendering said device conducting and non-conducting to periodically open and close said switch when preset within said boiling range and said load is at its boiling temperature, said heater and said electrical discharge device being energized by alternating voltage.

18. Control means for a heater comprising an electrically operated control element having control terminals, a bridge circuit provided with a voltage supply and comprising a first bridge arm which embodies a first impedance, a second bridge arm which embodies a thermal or temperature-responsive impedance, said first and second arms being joined, and two other arms comprising the respective sections of a potentiometer which are on opposite sides of the movable potentiometer contact, said contact having a substantially constant potential when moving over an intermediate portion of its range of movement on said potentiometer, means to fix the potential of a point on said potentiometer in said intermediate portion relative to the potential across the input terminals of said bridge, and connections including the potential difference between said contact and the junction of said first and second bridge arms between said control terminals.

19. Control means for a heater comprising an electrically operated control element having control terminals, a bridge circuit provided with a voltage supply and comprising a first bridge arm which embodies a first impedance, a second bridge arm which embodies a thermal or temperature-responsive impedance, said first and second arms being joined, and two other arms comprising the respective sections of a potentiometer which are on opposite sides of the movable potentiometer contact, said contact having a substantially constant potential when moving over an intermediate portion of its range of movement on said potentiometer, means to fix the potential of a point on said potentiometer in said intermediate portion relative to the potential across the input terminals of said bridge, connections including the potential difference between said contact and the junction of said first and second bridge arms between said control terminals, and means operative when said contact is positioned in said intermediate portion to cyclically modify the control means to alter the temperature of said thermal impedance at which said control element effects a given response.

20. In a heater means, control means including a pair of control terminals to reduce the heating effect of said heater means in response to impressing a predetermined voltage on said control terminals, a control device comprising a temperature-variable impedance which is positioned to be in thermal contact with a load for said heater means, a voltage source connected to said control device, said control device having a pair of output terminals between which appears a potential having a value dependent on the temperature of said temperature-variable impedance adjustable means in said device effective throughout a range of its adjustment to vary said potential, said potential varying not more than negligibly during adjustment in one part of said range and substantially more rapidly during adjustment in a second part of said range, provided that the temperature of said temperature-variable impedance remains substantially constant during the adjustment, means for producing a bias voltage, switching means for periodically shifting said bias voltage to one and then to the other of two predetermined values in response to adjustment of said adjustable means within said one part of said range, said bias voltage having a fixed value during said adjustment within said second portion of said range, and means for impressing on said control terminals the sum of said potential and said bias voltage.

References Cited in the file of this patent
UNITED STATES PATENTS

| | | |
|---|---|---|
| 2,220,028 | Smith | Oct. 29, 1940 |
| 2,376,488 | Jones | May 22, 1945 |
| 2,500,061 | Clark | Mar. 7, 1950 |
| 2,549,461 | Haller | Apr. 17, 1951 |
| 2,563,304 | Bjork | Aug. 7, 1951 |
| 2,585,005 | Godshalk et al. | Feb. 12, 1952 |
| 2,604,267 | Smith | July 22, 1952 |
| 2,629,073 | Smith | Feb. 17, 1953 |
| 2,632,599 | Hornfeck | Mar. 24, 1953 |